(12) United States Patent
McCarthy et al.

(10) Patent No.: US 11,845,639 B2
(45) Date of Patent: Dec. 19, 2023

(54) STABILITY FRAME, SYSTEM AND METHOD FOR THE INSTALLATION OF A WIND TURBINE ON AN OFFSHORE SUBSTRUCTURE

(71) Applicant: SAIPEM S.p.A., San Donato Milanese (IT)

(72) Inventors: Vincent George McCarthy, Kingston (GB); Christopher Sexton, San Donato Milanese (IT)

(73) Assignee: SAIPEM S.P.A., San Donato Milanese (IT)

( * ) Notice: Subject to any disclaimer, the term of this patent is extended or adjusted under 35 U.S.C. 154(b) by 1034 days.

(21) Appl. No.: 16/620,365

(22) PCT Filed: Jun. 19, 2018

(86) PCT No.: PCT/EP2018/066310
§ 371 (c)(1),
(2) Date: Dec. 6, 2019

(87) PCT Pub. No.: WO2018/234337
PCT Pub. Date: Dec. 27, 2018

(65) Prior Publication Data
US 2020/0141389 A1    May 7, 2020

(30) Foreign Application Priority Data

Jun. 19, 2017   (IT) .................. 102017000068019

(51) Int. Cl.
*B66C 1/10*     (2006.01)
*B66C 23/18*    (2006.01)
(Continued)

(52) U.S. Cl.
CPC .............. *B66C 1/108* (2013.01); *B63B 75/00* (2020.01); *B66C 23/185* (2013.01);
(Continued)

(58) Field of Classification Search
CPC ....... F03D 13/10; F03D 13/25; B66C 23/185; B66C 1/108; B66C 23/525; B66C 23/54; B63B 75/00
(Continued)

(56) References Cited

U.S. PATENT DOCUMENTS 3,666,216 A  *  5/1972  Nagy ...................... B63G 8/42
                                                    244/172.4
4,518,186 A  *  5/1985  Hornberg ................. B66C 1/66
                                                     294/82.24
(Continued)

FOREIGN PATENT DOCUMENTS

CN    101468774    7/2009
EP    1 925 582    5/2008
(Continued)

OTHER PUBLICATIONS

Notification Concerning Submission, Obtention or Transmittal of Priority Document for International Application No. PCT/EP2018/066310 dated Sep. 17, 2018.
International Search Report and Written Opinion for International Application No. PCT/EP2018/066310 dated Sep. 17, 2018.

*Primary Examiner* — Paul T Chin
(74) *Attorney, Agent, or Firm* — Neal, Gerber & Eisenberg LLP

(57) ABSTRACT

A stability frame for the installation of a wind turbine on an offshore substructure, wherein the wind turbine comprises a tower configured to be anchored to a rigging assembly below the barycenter of the wind turbine, has a main body configured to be mounted about the upper part of the tower; and a plurality of guides, which extend outwardly from the main body and are configured for constraining parts of the rigging assembly so as to laterally support the wind turbine by the rigging assembly.

22 Claims, 6 Drawing Sheets

(51) Int. Cl.
  *B66C 23/00* (2006.01)
  *F03D 13/10* (2016.01)
  *F03D 13/25* (2016.01)
  *B63B 75/00* (2020.01)
  *B66C 23/52* (2006.01)

(52) U.S. Cl.
  CPC ............ *B66C 23/525* (2013.01); *B66C 23/54* (2013.01); *F05B 2230/61* (2013.01); *F05B 2230/6102* (2013.01)

(58) Field of Classification Search
  USPC ........................................................ 294/67.1
  See application file for complete search history.

(56) References Cited

U.S. PATENT DOCUMENTS

| | | | |
|---|---|---|---|
| 7,648,183 B2 * | 1/2010 | Cornwell | B66C 1/62 |
| | | | 294/90 |
| 9,316,208 B2 * | 4/2016 | Friis | F03D 80/00 |
| 11,186,962 B2 * | 11/2021 | Van Vessem | B66C 1/108 |
| 11,198,597 B2 * | 12/2021 | Moeller | B66C 13/085 |
| 2012/0195768 A1 | 8/2012 | Van Nood et al. | |

FOREIGN PATENT DOCUMENTS

| | | |
|---|---|---|
| EP | 2 219 986 | 8/2010 |
| EP | 2 275 340 | 1/2011 |
| GB | 2423108 | 8/2006 |
| JP | 2010208723 | 9/2010 |
| WO | WO 2011/110818 | 9/2011 |

* cited by examiner

STABILITY FRAME, SYSTEM AND METHOD FOR THE INSTALLATION OF A WIND TURBINE ON AN OFFSHORE SUBSTRUCTURE

PRIORITY CLAIM

This application is a national stage application of PCT/EP2018/066310, filed on Jun. 19, 2018, which claims the benefit of and priority to Italian Patent Application No. 102017000068019, filed on Jun. 19, 2017, the entire contents of which are each incorporated by reference herein.

TECHNICAL FIELD

The present disclosure relates to a stability frame for the installation of a wind turbine on an offshore substructure. The present disclosure relates also to a system and method making use of the stability frame for the installation of a wind turbine on an offshore substructure.

For the purpose of the present disclosure the definition "wind turbine" identify a wind turbine including a tower; a nacelle mounted atop the tower; and a rotor fitted to the nacelle including a hub and a complete set of blades; the definition "tower" identifies an elongated vertical structure; the definition "nacelle" identifies a structure housing an electric generator and configured to be mounted atop the tower in a rotatable manner about the axis of the tower; and the definition "rotor" identifies an assembly comprising a hub to be fitted in rotatable manner to the nacelle.

BACKGROUND

European Patent No. EP 2 275 340 A2 discloses an installation jack-up vessel provided with a cantilever mast used to transfer of wind turbine components from the deck of the jack-up vessel to an offshore installation site and guide the transfer to prevent undesired swinging movements of the wind turbine components. In another embodiment, a main crane is used in cooperation with a guide arm to transfer and guide wind turbine components from the jack-up vessel to the offshore installation site. In another embodiment, several complete assembled wind turbines are transferred from the jack-up vessel to the installation site.

U.S. Published Patent Application No. U.S. 2012/0195768 A1 discloses transferring blades from onshore to a jack up vessel, assemble the two upper blades by using holding and assembly frame, assemble a third blade and lifting the nacelle together with the complete rotor above the tower and mounting the nacelle atop the tower.

While the site of installation is in deeper water, the installation jack-up vessel is replaced by DP-controlled vessel.

European Patent No. EP 2,219,986 B1 discloses an installation method comprising the steps of carrying on the deck of the DP-controlled vessel a tower with a single blade attached to it and lying on the deck in a horizontal configuration, and the nacelle, and the rotor fitted to the nacelle and including the hub and two blades in a bunny ear configuration; raising the tower together with the blade attached to it in a vertical configuration and placing the tower and said blade on an offshore substructure; lifting the nacelle and the rotor above the tower and coupling the nacelle atop the tower.

Great Britain Patent No. GB 2,423,108 discloses installing a wind turbine by means of a vessel in an offshore substructure provided with a foundation in the bottom of the body of water and a socket for housing the wind turbine. The vessel is configured to transfer the wind turbine in a reclined position on the deck of the vessel and comprises an A-frame operated by winches to erect the wind turbine above the substructure and nest the wind turbine in the socket.

In general, the installation of wind turbine in an offshore location has to face several problems deriving from the delicate structures of some components such as the blades that are usually made of glass-fiber, and the shape and the size of the wind turbines that are steadily increasing through time to actuate relatively more powerful electrical generators.

Certain of the above problems are even more emphasized when the installation site is in relatively deep water and waves and wind hamper the in situ assembly and any other maneuver concerning the installation of a wind turbine.

SUMMARY

One object of the present disclosure is to provide a stability frame for the installation of a wind turbine on an offshore substructure in a relatively safe and straightforward manner even in relatively deep water.

According to the present disclosure there is provided a stability frame for the installation of a wind turbine on an offshore substructure, wherein the wind turbine comprises a tower configured to be anchored to a rigging assembly below the barycenter of the wind turbine; the stability frame comprising:
- a main body configured to be mounted about the upper part of the tower;
- a plurality of guides, which extend outwardly from the main body and are configured for constraining parts of the rigging assembly; and
- two hooking members mounted on the main body and for cooperation with an automatic hooking assembly of a crane vessel for lifting and handling the stability frame.

In other words, the stability frame can be selectively clamped to the tower at a pre-selected height, above the barycenter, for constraining the rigging assembly, which is conveniently anchored to the lower part of the tower. The main body defines a wider perimeter with respect to the diameter of the tower at that height so that when the rigging assembly is anchored to the lower part of the tower and is tensioned the rigging assembly comes into contact with the stability frame, whereas the guides constrain parts of the rigging assembly in given or designated points of the stability frame. In such a way, the rigging assembly can laterally support the wind turbine in addition to carry the load of the wind turbine and avoid swinging of the wind turbine.

The stability frame is also connectable to tugger lines for tensioning the stability frame in a direction transversal to the lifting direction. In such a case, the eventual twisting of the wind turbine and the rigging assembly is prevented by the control of the stability frame by the tugger lines. For this purpose, the stability frame may be equipped with two attachments for the tugger lines that are operated from respective winches on a crane vessel.

In certain embodiments, the main body of the stability frame is U-shaped so as to enable a relatively easy insertion of the stability frame about the tower and, at the same time, surrounding large part of the tower diameter.

In certain embodiments, each guide comprises two bars provided with flared free ends to facilitate the insertion of the rigging assembly parts into the guide, in particular, in view of the insertion of the rigging assembly parts being done by lifting cranes.

According to a particular embodiment, the stability frame comprises four guides arranged two by two along opposite sides of the main body so as to define four constraining points for the rigging assembly.

According to a particular embodiment, the stability frame comprises a clamp assembly mounted on the main body for selectively anchoring the main body to the tower and releasing the main body from the tower. In this way, the stability frame can be recovered and further used for the installation of other wind turbines.

In particular, the clamp assembly comprises at least one idle clamp, which is mounted to the main body and extends inwardly from the main body, and two actuated clamps, which are configured to be actuated between retracted positions and inwardly projecting positions towards the idle clamp. In such a way, the stability frame can be relatively securely anchored to the tower and released from the tower for further use.

In certain embodiments, the stability frame comprises at least one hydraulic cylinders for each actuated clamp. The use of hydraulic cylinders enables exerting an adequate clamping force and selectively releasing the clamps for further use of the stability frame. Even though one hydraulic cylinder per actuated clamp is sufficient to exert the necessary force to secure the stability frame to the tower, a stability frame according to a particular embodiment of the present disclosure comprises two hydraulic cylinders per each actuated clamp for emergency reason. Said two hydraulic cylinders operatively connected to the same actuated clamp are actuated in parallel and may operate singly in case of failure of one of said two hydraulic cylinders.

In particular, each actuated clamp is articulated to an A-shaped frame, which is articulated to the main body; each hydraulic cylinder being articulated to the A-shaped frame and the main body so that each clamp can adapt to tower.

A further object of the present disclosure is to provide a system for installation of a wind turbine on an offshore substructure in a relatively safe and straightforward manner even in relatively deep water.

According to the present disclosure, there is provided a system for installation of a wind turbine on an offshore substructure, wherein the wind turbine comprises a tower, the system comprising:
  a stability frame as previously disclosed;
  a crane vessel; and
  a rigging assembly configured to be anchored to the tower below the barycenter of the wind turbine and to be constraint by the stability frame.

In this way, the rigging assembly carries the load of the wind turbine below the barycenter of the wind turbine to the benefit of the integrity the wind turbine and avoids swinging of the wind turbine about the anchoring of the rigging assembly to the tower above the barycenter of the wind turbine.

In particular, the crane vessel comprises two lifting cranes and the rigging assembly comprises two riggings, each operated by a respective lifting crane. In this way, the two lifting cranes can be operated in synchronism on opposite side of the stability frame to insert the respective riggings into the respective guides on the opposite sides of the stability frame.

In particular, each rigging comprises two hoisting lines, each one comprising a distal eyelet to be anchored to the tower and a rigid section to be inserted into a respective guide. In this way, the anchoring of the rigging assembly to the tower and the insertion of the rigging assembly into the guide is particularly relatively easy. In particular, the system comprises a hydraulic circuit comprising a first portion mounted on the stability frame; a second portion located in a remote position with respect to the stability frame; and an umbilical for selectively connecting the first portion to the second portion so that the hydraulic cylinders on the stability frame can be remotely controlled.

According to a particular arrangement of the hydraulic circuit, the first portion comprises valves remotely controlled; a quick connect coupling for connection to the umbilical; and a hydro-pneumatic accumulator, and the second portion comprises a high pressure unit to define a degree of autonomy to the first portion and enable releasing the pressure from the hydraulic cylinders without affecting the second portion.

According to a particular embodiment of the disclosure, the system comprises a control system for controlling the operating status of the stability frame; the control system comprising a first portion mounted on the stability frame; and a second portion located in a remote position with respect to the stability frame; and an umbilical for selectively connecting the first portion to the second portion. In this way, it is possible to check the operating status of the stability frame and remotely control the operation of the stability frame. For this purpose, the first portion comprises sensors for acquiring signals correlated to the operating status of the stability frame, and the second portion comprises a control unit and a control panel.

According to a particular embodiment of the present disclosure, the system comprising winches for operating tugger lines connected to the stability frame. These winches apply tensioning forces to the stability frame that pull the wind turbine towards the vessel to avoid twisting of the wind turbine and the rigging assembly when the wind turbine is hung to lifting cranes. The crane vessel conveniently carries the winches. For the same reason, the system may comprise further winches carried by the crane vessel for operating tugger lines connected to the bottom of the tower.

A further object of the present disclosure is to provide a method for installation of a wind turbine on an offshore substructure in a relatively safe and straightforward manner even in relatively deep water.

According to the present disclosure, there is provided a method for installation of a wind turbine on an offshore substructure, the method comprising the steps of:
  coupling a stability frame as previously disclosed to the upper part of a tower of the wind turbine;
  controlling a rigging assembly by a crane vessel;
  anchoring a rigging assembly to the lower part of the tower below the barycenter of the wind turbine;
  constraining parts of the rigging assembly into the guides of the stability frame;
  lifting the wind turbine by the crane vessel in a vertical configuration;
  transferring the wind turbine hung in vertical configuration to the offshore substructure; and
  lowering the wind turbine on the offshore substructure.

The method according to the present disclosure enables stable lifting, transferring, and lowering of the wind turbine on the substructure even in the condition when the rigging assembly is anchored to the lower part of tower below the barycenter of the wind turbine.

In more detail, the step of controlling the rigging assembly comprises controlling a first rigging of the rigging assembly by a first lifting crane of the crane vessel and controlling a second rigging by a second lifting crane of the crane vessel so as to insert parts of the rigging assembly into the guides of the stability frame from opposite sides of the stability frame. In this way, the connection of the rigging assembly to the wind turbine and the insertion of parts of the rigging assembly into the guides of the stability frame is relatively simplified.

Advantageously, the stability frame is clamped to the tower of a wind turbine, in particular to the upper half of the tower by hydraulic cylinders mounted on the stability frame. Remotely control valves may lock the pressure into the hydraulic cylinders when the stability frame is clamped in position by valves arranged on the stability frame.

According to the method of the present disclosure, the operating status of the stability frame can be remotely controlled by telemetry.

According to a particular embodiment of the present disclosure, the method comprises tensioning tugger lines between the stability frame and the crane vessel to avoid twisting of the wind turbine and the rigging assembly about the lifting direction.

For the same purpose, the method may include tensioning further tugger lines between the lower part of the tower and the crane vessel.

Additional features are described in, and will be apparent from the following Detailed Description and the figures.

BRIEF DESCRIPTION OF THE DRAWINGS

A number of non-limiting embodiments of the present disclosure will be described by way of example with reference to the accompanying drawings, in which.

DETAILED DESCRIPTION

Figure 1:
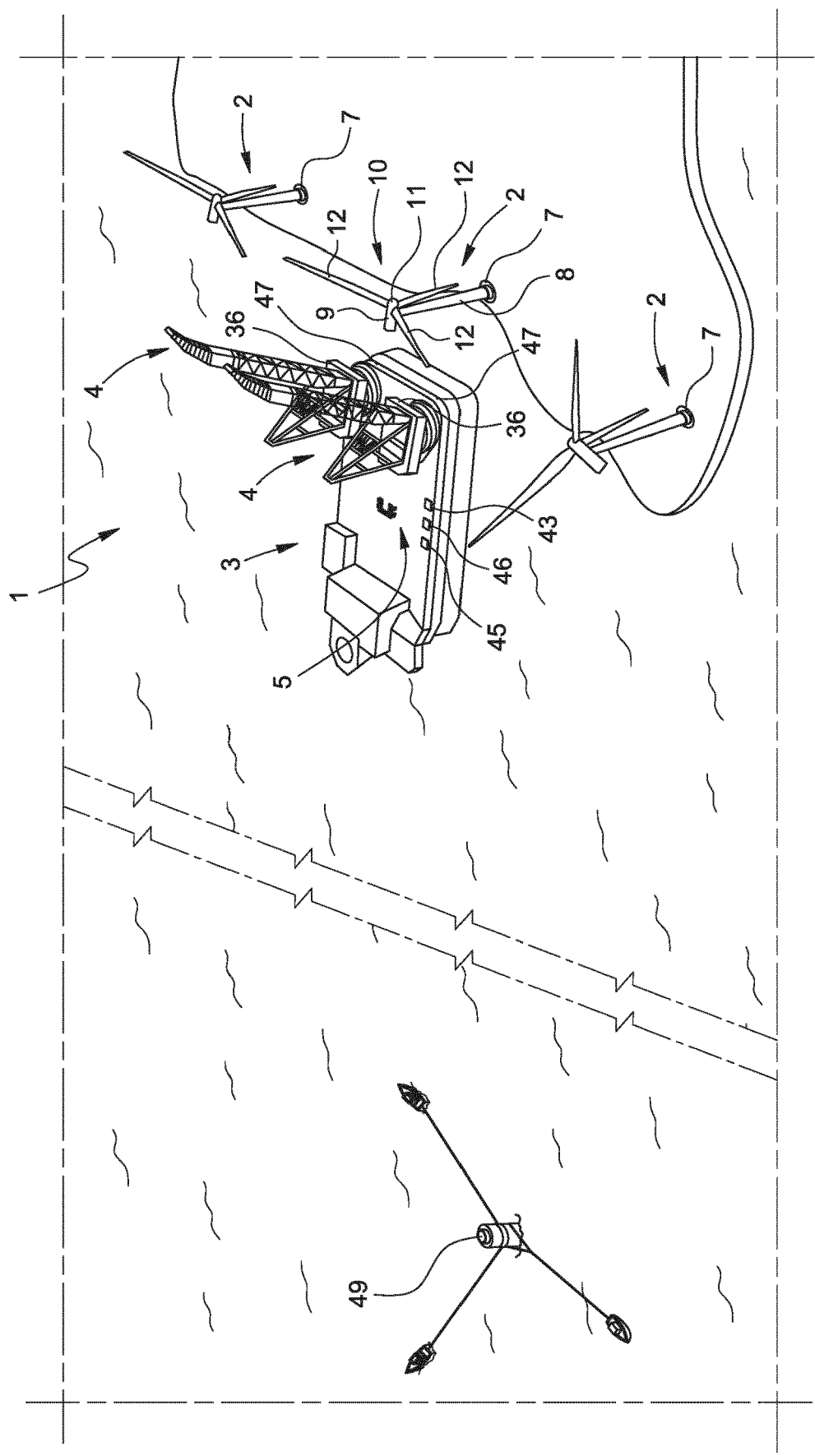
FIG. 1 shows a perspective view, with parts removed for clarity, of a system for the installation of a wind turbine on an offshore substructure in accordance to the present disclosure.

Number 1 in FIG. 1 indicates a system for installation of a wind turbine on an offshore substructure 49. According to the present disclosure, the installation of a wind turbine 2 includes transferring the wind turbine 2 from an onshore assembly site to an offshore site by a crane vessel 3. The system 1 comprises the crane vessel 3, which, in particular, is a "dual crane vessel" provided with two lifting cranes 4 operating side by side for example as the dual crane vessel "SAIPEM 7000" belonging to the applicant; a stability frame 5 configured to assist the crane vessel 3 to safely transfer the wind turbine 2; and a rigging assembly 6 (FIG. 2) operated by the crane vessel 3 and configured to cooperate with the stability frame 5. The wind turbine 2 is assembled on an onshore substructure 7 located on an onshore construction site and comprises a tower 8 extending along a longitudinal axis A1; a nacelle 9 rotatably mounted atop the tower 8; and a rotor 10 rotatably mounted to the nacelle 9. The rotor 10 further comprising a hub 11 and blades 12 radially extending from the hub 11. The wind turbine 2 comprises also four trunnions 13 located along the lower part of the tower 8 and configured to be engaged by the rigging assembly 6.

Figure 2:
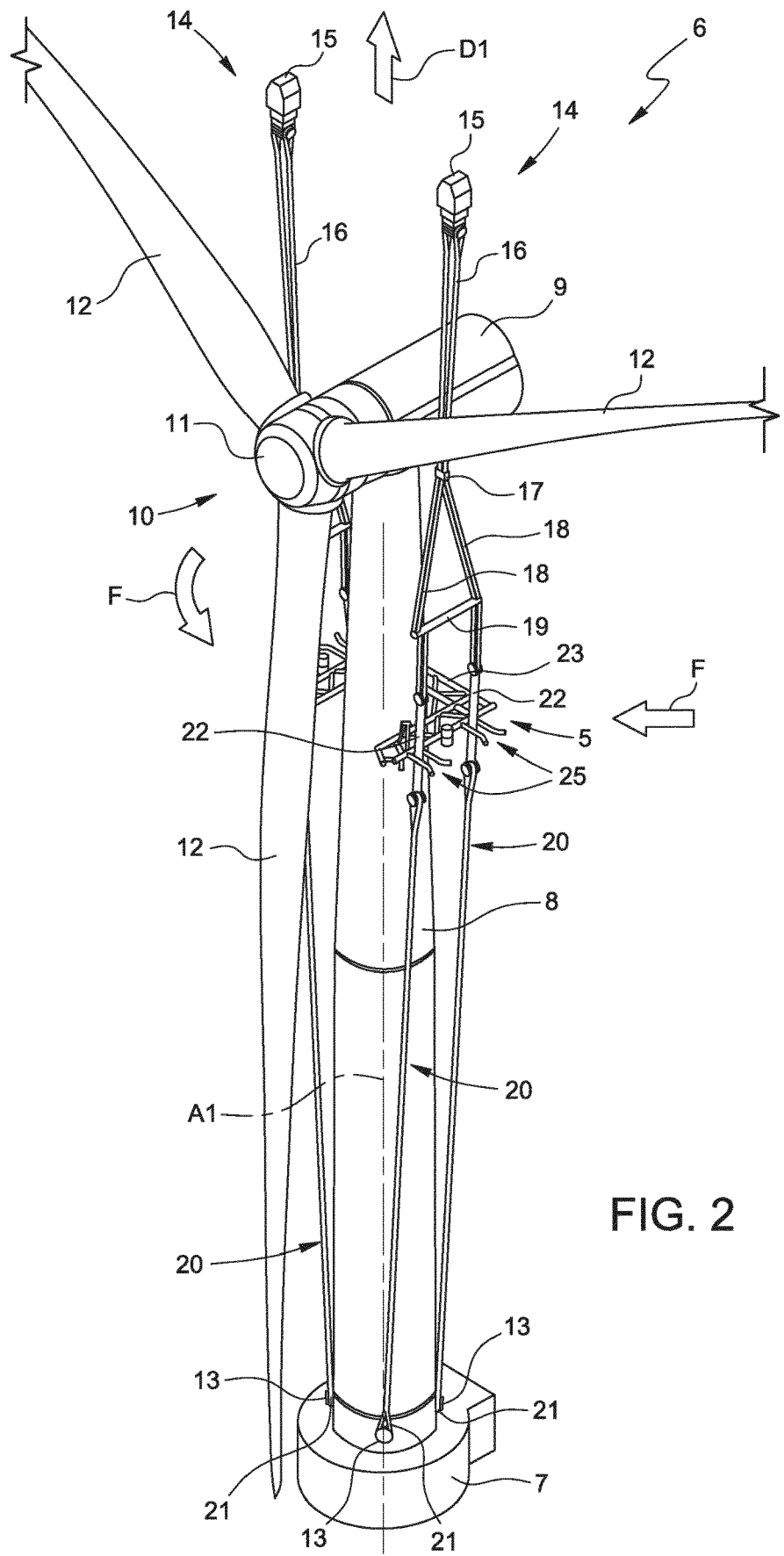
FIG. 2 shows a perspective view, with parts removed for clarity, of the a stability frame and rigging assembly of the system of FIG. 1 anchored to the wind turbine.

With reference to FIG. 2, the rigging assembly 6 comprises two riggings 14 each one operated by a respective lifting crane 4. Each rigging 14 comprises one upper block 15 for connection to lifting crane 4; a double sling 16; a further block 17; two slings 18 for connections of block 17 to a spreader bar 19; and two hoisting lines 20 appended to the spreader bar 19 and having eyelets 21 at their distal ends to be anchored to respective trunnions 13 integral to the lower part of the tower 8. Each hoisting line 20 comprises an elongated flexible rope and an intermediate rigid section 22, which is a bar or a tube, is connected to rope, and is configured to cooperate, in use, with the stability frame 5. Namely, the rigid sections 22 are inserted into respective guides 25 by rotation of lifting cranes 4 (FIG. 1) according to arrows F.

Figure 3:
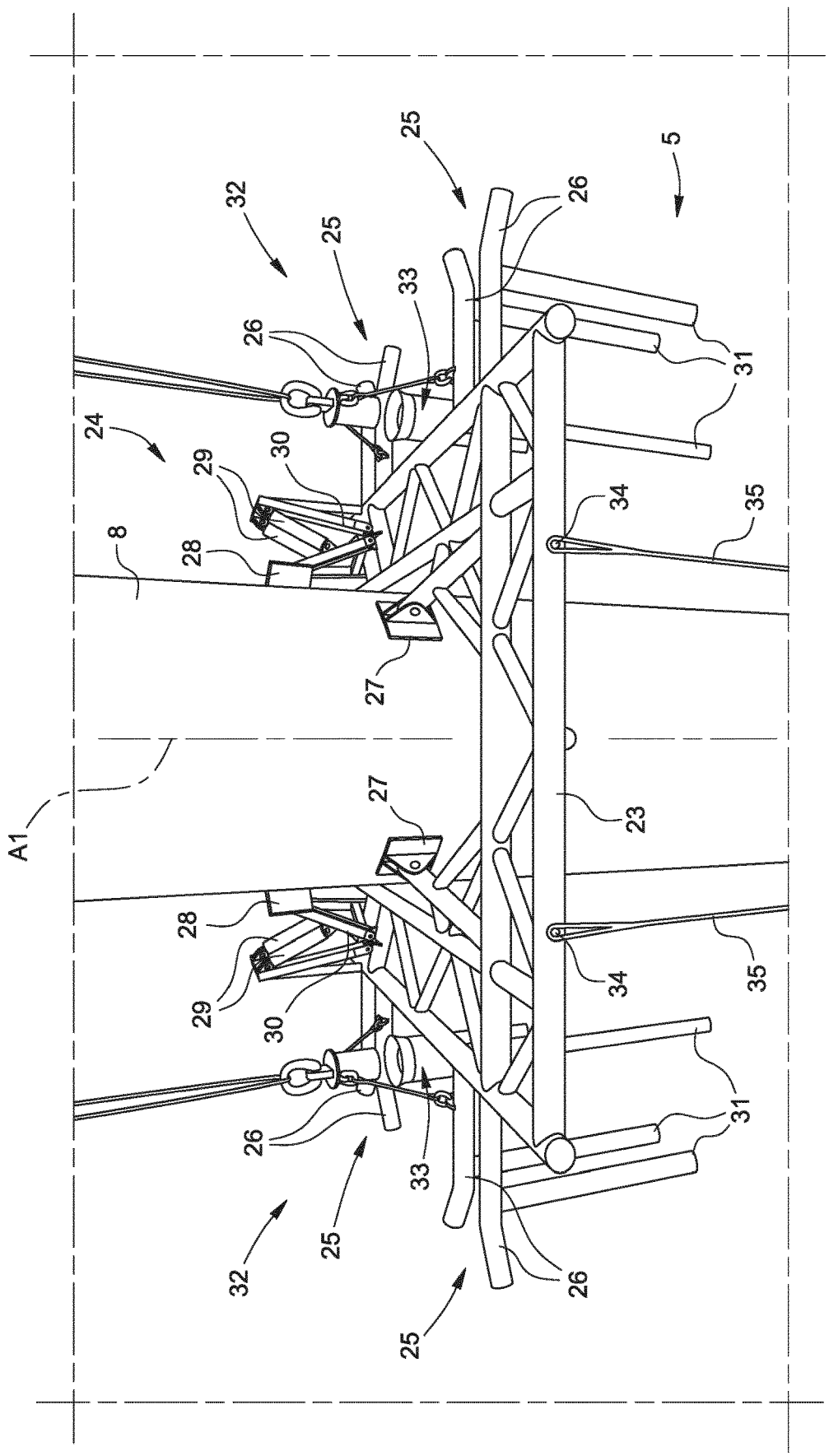
FIG. 3 shows a perspective view, with parts removed for clarity in an enlarged scale, of a detail of FIG. 1.

With reference to FIG. 3, the stability frame 5 comprises a U-shaped main body 23 configured to be mounted about the tower 8; a clamp assembly 24 mounted on the main body 23 configured to selectively anchor and release the main body 23 about the tower 8 of the wind turbine 2; and a plurality of guides 25, which extend outwardly from the main body 23 and are configured for guiding parts of the riggings 14, in particular the rigid sections 22 of the riggings 14 (FIG. 2). Each guide 25 comprises two bars 26 provided with flared free ends to facilitate the insertion of the riggings 14 (FIG. 2) into the guides 25. In the example shown, the stability frame 5 comprises four guides 25 arranged two by two along opposite sides of the main body 23. The clamp assembly 24 comprises two idle clamps 27, which are mounted to the main body 23 and extends inwardly from the main body 23, and two actuated clamps 28, which are configured to be actuated between retracted positions and inwardly projecting positions towards the idle clamps 27 by hydraulic cylinder 29. According to an alternative embodiment, one idle clamp is sufficient to anchor the stability frame to the tower 8.

In the embodiments shown, the stability frame 5 comprises two hydraulic cylinders 29 for each actuated clamp 28. These hydraulic cylinders 29 of each actuated clamp 28 are operated in parallel and are configured to operate singly in case of failure of one of said two hydraulic cylinders 29. Each actuated clamp 28 is articulated to an A-shaped frame 30, which, in turn, is articulated to the main body 23 and each hydraulic cylinder 29 is articulated to the A-shaped frame 30 and the main body 23. The stability frame 5 is provided with supporting legs 31 and is displaced by the lifting cranes 4 and for this purpose is provided with two hooking members 33 mounted on the main body 23 for connection of the stability frame 5 to the lifting cranes 4, in particular to an automatic hooking assembly 32 associated to lifting cranes 4. The stability frame 5 comprises two attachments 34 for tugger lines 35 operated from winches 36 of the dual crane vessel 3 (FIG. 1).

Figure 4:
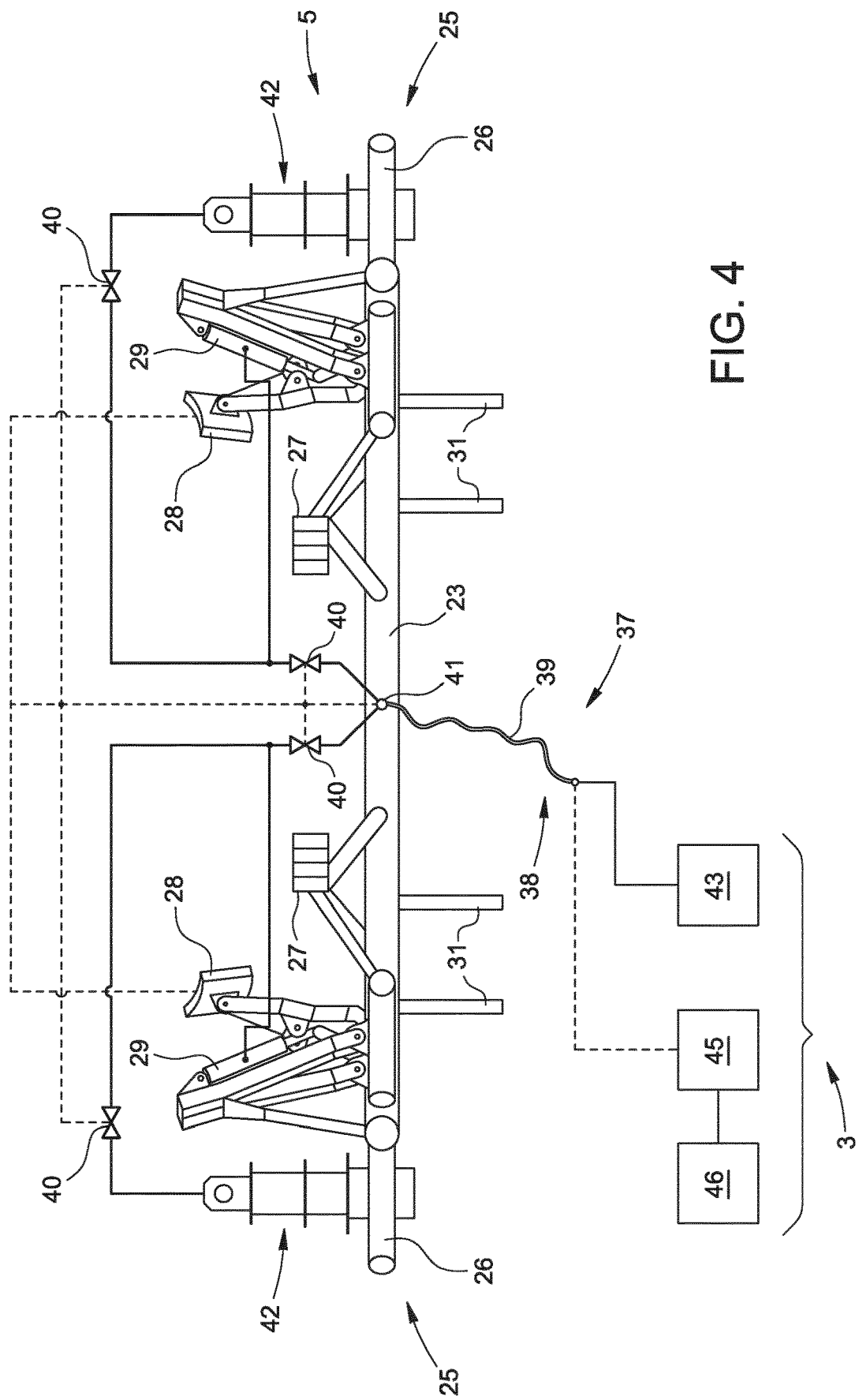
FIG. 4 is a schematic view, with parts removed for clarity, of the system of FIG. 1 with details relating to a hydraulic circuit and a control system.

With reference to FIG. 4, the system 1 is configured to control the stability frame 5 from a remote position and for this purpose comprises a hydraulic circuit 37 and a control system 38 that partly extend along the stability frame 5 and partly on the crane vessel 3. In particular, the hydraulic circuit 37 comprises a first portion mounted on the stability frame 5; a second portion located in the crane vessel 3; and an umbilical 39 configured to selectively connect the first portion to the second portion. The first portion comprises valves 40 remotely controlled for supplying and discharging the hydraulic cylinder 29; a quick connect coupling 41 for connection to the umbilical 39; and a hydro-pneumatic accumulator 42, wherein the second portion comprises a high-pressure unit 43.

According to a variation (not shown in the drawings), the umbilical is omitted and the hydraulic circuit is confined in the stability frame. In such a case, the source of pressure for actuating the cylinders may be embodied in a container under pressure and valves controlled by telemetry.

The control system 38 comprises a first portion mounted on the stability frame 5; and a second portion located in the crane vessel. The first and the second portion of the control system 38 are connected by umbilical 39 configured to selectively connect the first portion to the second portion.

The first portion of the control system 38 comprises sensors 44, such as strain gauges and position sensors, configured to acquire signals correlated to the operating status of the stability frame 5, and the second portion comprises a control unit 45 and a control panel 46. In alternative, the umbilical can be omitted.

Figure 5:
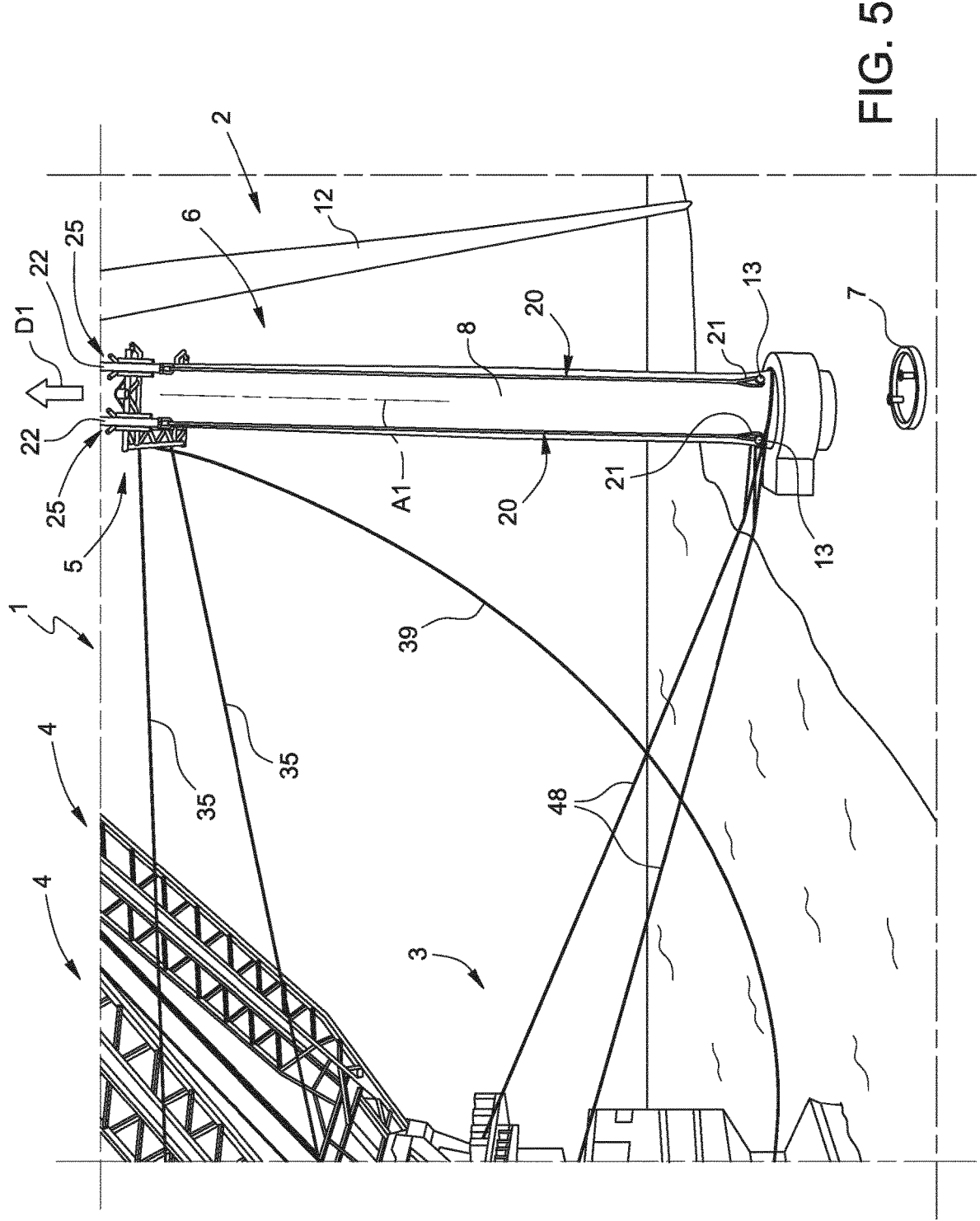
FIG. 5 shows a perspective view, with parts removed for clarity, of the step of lifting the wind turbine off the onshore site.

With reference to FIG. 5, the system 1 comprises further winches 47 (FIG. 1) on the crane vessel 3 for operating tugger lines 48 configured to be connected to the bottom of the tower 8.

In use, the installation of the wind turbine 2 on an offshore substructure 49 requires lifting the wind turbine 2 off the onshore basement 7 by the vessel crane 3 in direction D1 (FIG. 5); transferring the wind turbine 2 hung to the lifting cranes 4 between the onshore substructure 7 and the offshore substructure 49 (FIG. 6); and lowering the wind turbine 2 in the direction D2 so as to nest the wind turbine 2 into a socket of the offshore substructure 49.

The rotor 10 of the wind turbine 2 is locked with respect to the nacelle 9 with one blade 12 parallel to the tower 8, and the nacelle 9 is locked in a configuration according to which the rotor 10 is on the opposite side of the shore. Once the wind turbine 2 is locked in the above configuration, the stability frame 5 is coupled to the tower 8 of the wind turbine 2, in particular to the upper half of the tower 8 in particular in close proximity of the nacelle 9 with the assistance of the crane vessel 3. The stability frame 5 is first transferred onshore from the deck of the crane vessel 3 by one lifting crane 4 and then is lifted by the two lifting cranes 4 and inserted about the tower 4. When the stability frame 5 is in the target position, the stability frame 5 is clamped to the tower 8 by the remotely controlled hydraulic cylinders 29. Valve 40 are closed to lock the pressure into the hydraulic cylinders 29 and avoid that the hydraulic fluid flows back from hydraulic cylinders 29. The control system 38 checks from a remote position by telemetry or through the umbilical 39 whether the forces exerted by hydraulic cylinders 29 are within a given or designated range.

Once the stability frame 5 is safely clamped to the wind turbine 2, the lifting cranes 4 are equipped with the rigging assembly 6, which, in turn, is anchored to the wind turbine 2 and is partly inserted into the guides 25 of the stability frame 5 according to the configuration shown in FIG. 2.

Each lifting crane 4 provide for arranging two eyelets 21 in close proximity of two corresponding trunnions 13, and the two rigid sections 22 in proximity of two corresponding guides 25. The eyelets 21 are anchored to the trunnions 31 and the rigid sections 22 are inserted into the guides 25.

Once the wind turbine 2 is lifted off the onshore substructure 7 as shown in FIG. 5, tugger lines 35 anchored to the stability frame 5 are tensioned and extend along directions transversal to the lifting direction D1 mutually divergent from the stability frame 5. Similarly, tugger lines 48 anchored to the bottom of the tower 8 are tensioned and extend along directions transversal to the lifting direction D1 mutually divergent from the stability frame 5.

Figure 6:
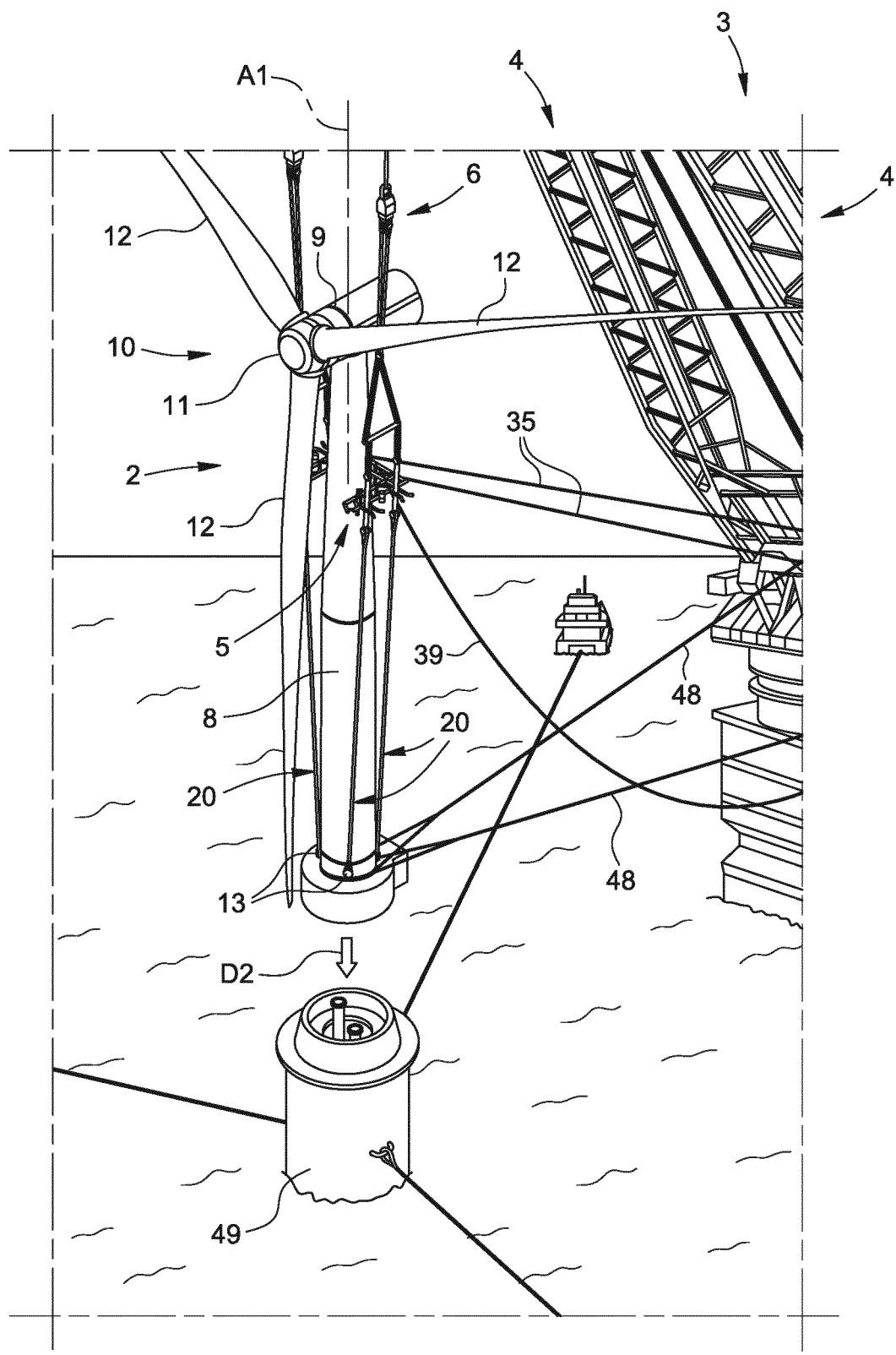
FIG. 6 shows a perspective view, with parts, removed for clarity, of the step of lowering the wind turbine on the offshore site.

Once the stability wind turbine 2 is safely hung to the lifting cranes 4 and secured to the crane vessel 3 by tugger lines 35 and 48, the wind turbine 2 is transferred offshore above the offshore substructure 49 as shown in FIG. 6. Then, the wind turbine 2 is lowered in the direction D2 and tugger lines 35 and 48 are controlled to assist centering the socket of the offshore substructure 49.

Once the wind turbine 2 is secured to the offshore substructure 49, tugger lines 35 and 48, rigging assembly 6, and the stability frame 5 are recovered on the crane vessel 3.

In case of emergency, the hydraulic fluid under pressure into the hydraulic cylinders 29 can be recovered into the hydro-pneumatic accumulator 42 (FIG. 4) on the stability frame 5 by remotely controlled valve 40.

It is clear that the present disclosure includes variations that are not specifically described and fall within the scope of the protection of the following claims. Accordingly, various changes and modifications to the presently disclosed embodiments will be apparent to those skilled in the art.

The invention claimed is:

1. A wind turbine offshore substructure installation stability frame comprising:
    a main body configured to be mounted about an upper part of a tower of a wind turbine, the tower being configured to be anchored to a rigging assembly below a barycenter of the wind turbine;
    a plurality of guides each extending outwardly from the main body and are each configured to constrain a part of the rigging assembly; and
    two hooking members mounted on the main body and configured to cooperate with an automatic hooking assembly of a crane vessel.

2. The wind turbine offshore substructure installation stability frame of claim 1, wherein the main body comprises two attachments for tugger lines.

3. The wind turbine offshore substructure installation stability frame of claim 1, wherein the main body is U-shaped.

4. The wind turbine offshore substructure installation stability frame of claim 1, wherein each guide comprises two bars with flared free ends configured to facilitate an insertion of the part of the rigging assembly into the guide.

5. The wind turbine offshore substructure installation stability frame of claim 1, wherein the plurality of guides comprises four guides arranged two-by-two along opposite sides of the main body.

6. The wind turbine offshore substructure installation stability frame of claim 1, further comprising a clamp assembly mounted on the main body and configured to selectively anchor the main body to the tower and release the main body from the tower.

7. The wind turbine offshore substructure installation stability frame of claim 6, wherein the clamp assembly comprises at least one idle clamp mounted to the main body and extending inwardly from the main body, and two actuated clamps configured to be actuated between retracted positions and inwardly projecting positions towards the idle clamp.

8. The wind turbine offshore substructure installation stability frame of claim 7, further comprising at least one hydraulic cylinder for each actuated clamp.

9. A wind turbine offshore substructure installation system comprising:
 a stability frame comprising:
  a main body mounted about an upper part of a tower of a wind turbine,
  a plurality of guides each extending outwardly from the main body, and
  two hooking members mounted on the main body;
 a crane vessel comprising an automatic hooking assembly that cooperates with the two hooking members of the stability frame; and
 a rigging assembly anchored to the tower below a barycenter of the wind turbine and configured to be constrained by the stability frame.

10. The wind turbine offshore substructure installation system of claim 9, wherein the crane vessel comprises a first lifting crane and a second lifting crane, and the rigging assembly comprises a first rigging that operates with the first lifting cane and a second rigging that operates with the second lifting crane.

11. The wind turbine offshore substructure installation system of claim 10, wherein each rigging comprises two hoisting lines, each hoisting line comprising a distal eyelet anchored to the tower and a rigid section inserted into a guide of the stability frame.

12. The wind turbine offshore substructure installation system of claim 9, further comprising a hydraulic circuit comprising a first portion mounted on the stability frame, a second portion located in a remote position with respect to the stability frame, and an umbilical that selectively connects the first portion to the second portion.

13. The wind turbine offshore substructure installation system of claim 12, wherein:
 the first portion comprises a remotely controlled valve, a quick connect coupling connected to the umbilical, and a hydro-pneumatic accumulator, and
 the second portion comprises a high-pressure unit.

14. The wind turbine offshore substructure installation system of claim 9, further comprising a control system comprising a first portion mounted on the stability frame, a second portion located in a remote position with respect to the stability frame, and an umbilical that selectively connects the first portion to the second portion.

15. The wind turbine offshore substructure installation system of claim 14, wherein:
 the first portion comprises a sensor configured to acquire a signal correlated to the operating status of the stability frame, and
 the second portion comprises a control unit and a control panel.

16. The wind turbine offshore substructure installation system of claim 9, further comprising a first winch that operates a first tugger line connected to the stability frame.

17. The wind turbine offshore substructure installation system of claim 16, further comprising a second winch that operates a second tugger line connected to a bottom of the tower.

18. A method of installing a wind turbine on an offshore substructure, the method comprising:
 coupling a stability frame to an upper half of a tower of the wind turbine, the stability frame comprising a main body, a plurality of guides each extending outwardly from the main body, and two hooking members mounted on the main body;
 controlling a rigging assembly by a crane vessel;
 anchoring the rigging assembly to a lower part of the tower below a barycenter of the wind turbine;
 constraining a plurality of parts of the rigging assembly into the plurality of guides of the stability frame;
 vertically lifting the wind turbine by the crane vessel;
 transferring the wind turbine to the offshore substructure; and
 lowering the wind turbine on the offshore substructure.

19. The method of claim 18, wherein controlling the rigging assembly comprises controlling a first rigging of the rigging assembly by a first lifting crane of the crane vessel and controlling a second rigging of the rigging assembly by a second lifting crane of the crane vessel to insert the plurality of parts of the rigging assembly into the plurality of guides of the stability frame from opposite sides of the stability frame.

20. The method of claim 18, wherein coupling the stability frame comprises clamping the stability frame to the upper half of the tower by a hydraulic cylinder mounted on the stability frame.

21. The method of claim 18, further comprising tensioning a first plurality of tugger lines between the stability frame and the crane vessel.

22. The method of claim 21, further comprising tensioning a second plurality of tugger lines between a lower part of the tower and the crane vessel.

* * * * *